United States Patent Office

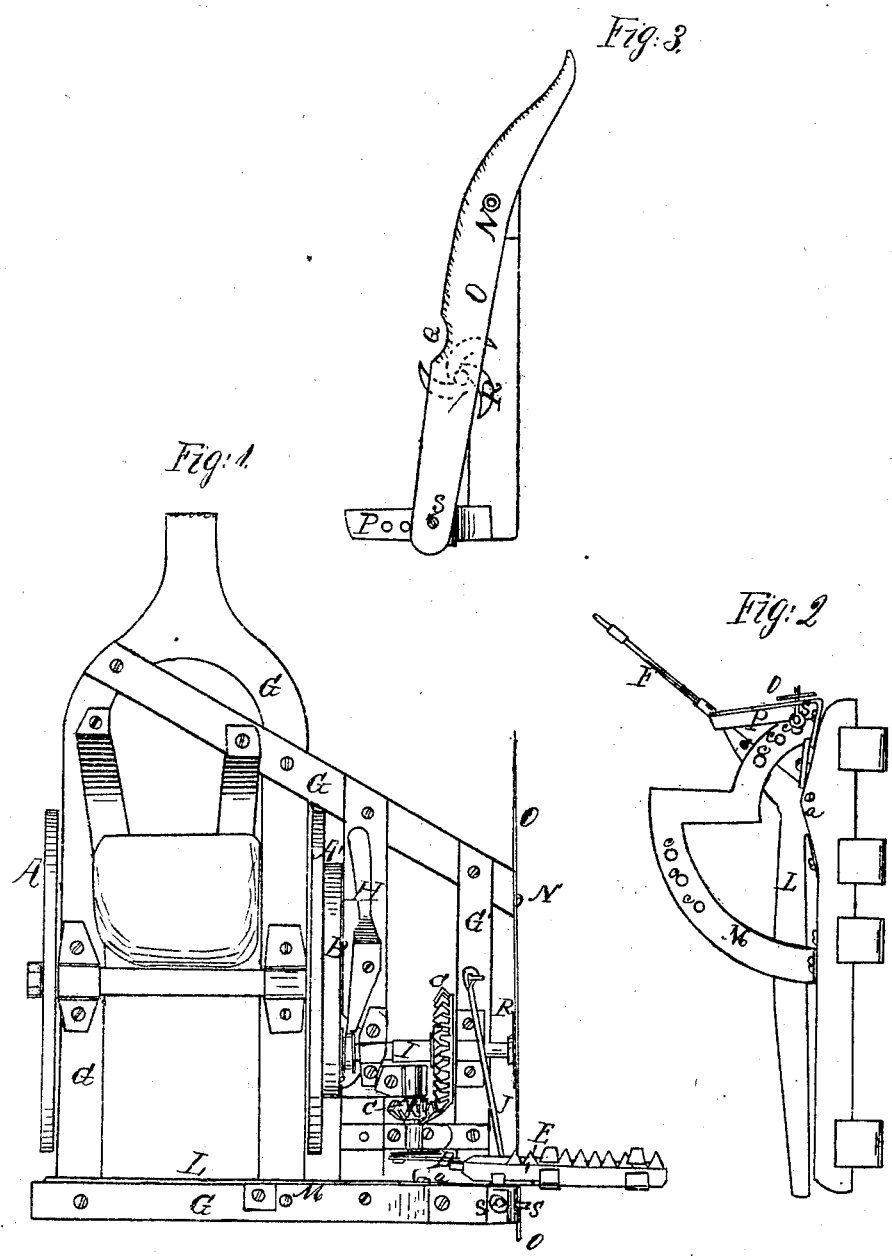

ARMSTRONG TWEEDY, OF COLLINSVILLE, OHIO.

Letters Patent No. 67,380, dated July 30, 1867.

---

HEDGE-TRIMMING MACHINE.

---

*The Schedule referred to in these Letters Patent and making part of the same.*

---

TO ALL WHOM IT MAY CONCERN:

Be it known that I, ARMSTRONG TWEEDY, of Collinsville, in Butler county, in the State of Ohio, have invented a new and useful improvement in Hedge-Trimming Machines; and I do hereby declare that the following is a full and exact description thereof, reference being had to the accompanying drawings, and to the letters of reference marked thereon.

Figure 1 represents my improved machine complete.

Figure 2 represents a view of the rear portion of the same detached.

Figure 3 is a view of the side-trimming apparatus detached.

The plan of my machine, represented in fig. 1, resembles a harvester, having two carrying-wheels A A', the latter being a driving-wheel, connected by its gear-wheel B with suitable bevelled pinions C C, and crank-rod D, for operating the cutter E. The driver's seat, F, is connected with the frame G G', which extends laterally to support the gearing and cutters. H is the shipping-lever, by which the small pinion on the shaft I may be thrown in and out of gear with the gear-wheel B connected to driving-wheel A'. J is a brace-rod, hinged by a loop and staple to the outer frame-piece G', and this rod is connected with the bar L, upon which the cutter E rests, and may be adjusted with the cutter, as will be fully described. The cutter-bar L is angular, and extends across the rear portion of the frame G, and is pivoted at a so as to be capable of adjustment. The arched metal plate M is secured by screws to the rear frame-piece, and stands vertically immediately behind the cutter E and the cutter-bar L. This plate is provided with series of holes through the segmental portions thereof, by which means a pin may be inserted to hold the cutter with its bar L at any desired angle for trimming the top of a hedge. At the side of the frame, and connected therewith by the pivot N, there is an adjustable elevator and auxiliary cutter, O. The rear end of this elevator and cutter O is provided with a suitable hole for the insertion of a pin, which will secure cutter O (at any desired angle) to the upright brace iron P, which is fastened to the rear corner of the frame, as represented in the drawings. This curved elevating cutter O is inclined inwards at its edge, and has a curved depression, Q. Its edge is bevelled upon the outer side so as to most effectually assist the revolving knife or knives R in trimming the side of a hedge. The knife R is keyed to the outer end of shaft I, and revolves with it. The cutter, which also serves as an elevator for the twigs at the side of the hedge to be trimmed, may be adjusted upon its pivot N in the arc of a circle, and secured at different inclinations by means of the pin S, which passes through both the cutter and post P, the latter being provided with suitable holes for the purpose.

In using my improved hedge-trimmer, the cutter O will be adjusted at such an angle as to cause its point to pass under the side branches of the hedge, and as the machine progresses the knife O and revolving knives R will sever the twigs, while at the same time the cutter E, standing at a suitable angle, as seen in fig. 2, will trim off one side of the top of the hedge. If the hedge is short, the knife E will be adjusted to a corresponding position. Both the reciprocating knife or cutter E and rotary cutter R are driven by the same actuating mechanism, and their speed may be increased or diminished by any necessary additional gearing which will effect the purpose. By means of the extended bar L the cutter E may be adjusted in the arc of a circle with great ease and facility, and retained in the desired position by a pin to be inserted through one of the holes c c c in the plate M. The plate M, post P, and rod J will brace and support the cutter E, with its bar L, while performing its work. A suitable sheet-metal shield may be connected with frame-piece G', and bent laterally so as to cover and protect the gearing from the trimmings which will be severed by the cutters.

Having fully described my improvements in hedge-trimmers, what I claim therein, and desire to secure by Letters Patent, is—

1. The cutter O, in combination with knives R, when constructed, arranged, and operating in relation to frame G G' in the manner and for the purpose described.

2. The combination of the cutter E with bar L, plate M, post P, and rod J, when arranged to operate conjointly with cutter O and knives R, in the manner substantially as and for the purpose specified.

In testimony whereof I have hereunto set my hand this 20th day of April, 1867.

A. TWEEDY.

Witnesses:
 I. A. COONS,
 A. M. JEWEL.